(12) United States Patent
Kalb et al.

(10) Patent No.: US 7,449,855 B2
(45) Date of Patent: Nov. 11, 2008

(54) WINDOW LIFTER, CONTROLLING DEVICE FOR A WINDOW LIFTER AND METHOD FOR THE CONTROL OF A WINDOW LIFTER

(75) Inventors: Roland Kalb, Rossach (DE); Jochen Held, Forchheim (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 535 days.

(21) Appl. No.: 11/110,908

(22) Filed: Apr. 21, 2005

(65) Prior Publication Data

US 2005/0184694 A1 Aug. 25, 2005

Related U.S. Application Data

(63) Continuation of application No. PCT/EP2004/011698, filed on Oct. 16, 2004.

(30) Foreign Application Priority Data

Oct. 22, 2003 (DE) ................... 203 16 222

(51) Int. Cl.
  *H02P 5/00* (2006.01)
  *H02P 3/00* (2006.01)
(52) U.S. Cl. .................. 318/452; 318/283; 318/466; 318/565; 318/286
(58) Field of Classification Search ......... 318/260–266, 318/280–286, 565
See application file for complete search history.

(56) References Cited

U.S. PATENT DOCUMENTS

| 5,399,950 A | * | 3/1995 | Lu et al. ..................... 318/565 |
| 5,422,551 A |   | 6/1995 | Takeda et al. |
| 5,539,290 A | * | 7/1996 | Lu et al. ..................... 318/565 |
| 5,585,107 A |   | 12/1996 | Brieden |
| 5,977,732 A | * | 11/1999 | Matsumoto ................ 318/283 |

(Continued)

FOREIGN PATENT DOCUMENTS

DE  195 14 257  7/1996

OTHER PUBLICATIONS

Derwent Abstract—Leopold Kostal GMBH & Co Kg; Jul. 11, 1996; Title: Method of monitoring motion of objects wirh motorised adjustment, esp. motor car windows and sun roofs involves comparing a stored period threshold value with the current period value during the motor run-up phase, switching motor off it threshold exceeded.

(Continued)

*Primary Examiner*—Paul Ip
(74) *Attorney, Agent, or Firm*—Jacob Eisenberg

(57) ABSTRACT

The present invention relates to an electronic controlling device with a computer unit installed to control a regulating device especially a window lifter of a motor vehicle. The computer unit stops or initiates the stop of a regulating motion of the window lifter drive if a signal correlating to the rotary moment of the window lifter drive exceeds a response level. In the setting range of a starting motion from standstill of the window lifter drive, the response level is a setting range dependant and/or time-related dependant preset function with at least one parameter determining the course of this function. The parameter value is modified in dependence from the starting motion of the window lifter drive.

18 Claims, 1 Drawing Sheet

U.S. PATENT DOCUMENTS

| | | | | |
|---|---|---|---|---|
| 5,994,858 | A | * | 11/1999 | Miura ........................ 318/283 |
| 6,154,145 | A | * | 11/2000 | Talbot ........................ 340/5.2 |
| 6,194,855 | B1 | * | 2/2001 | Lochmahr et al. ........... 218/283 |
| 6,274,947 | B1 | | 8/2001 | Terashima |
| 6,298,295 | B1 | | 10/2001 | Tyckowski |
| 2003/0052631 | A1 | * | 3/2003 | Kusunoki ................... 318/285 |
| 2003/0171866 | A1 | | 9/2003 | Heinrich et al. |
| 2005/0116672 | A1 | * | 6/2005 | Ohshima .................... 318/286 |

OTHER PUBLICATIONS

Delphion Abstract for DE19514257C1, indicating patent family Jul. 11, 1996.

PCT International Preliminary Report for PCT/EP2004/011698, Oct. 16, 2004.

* cited by examiner

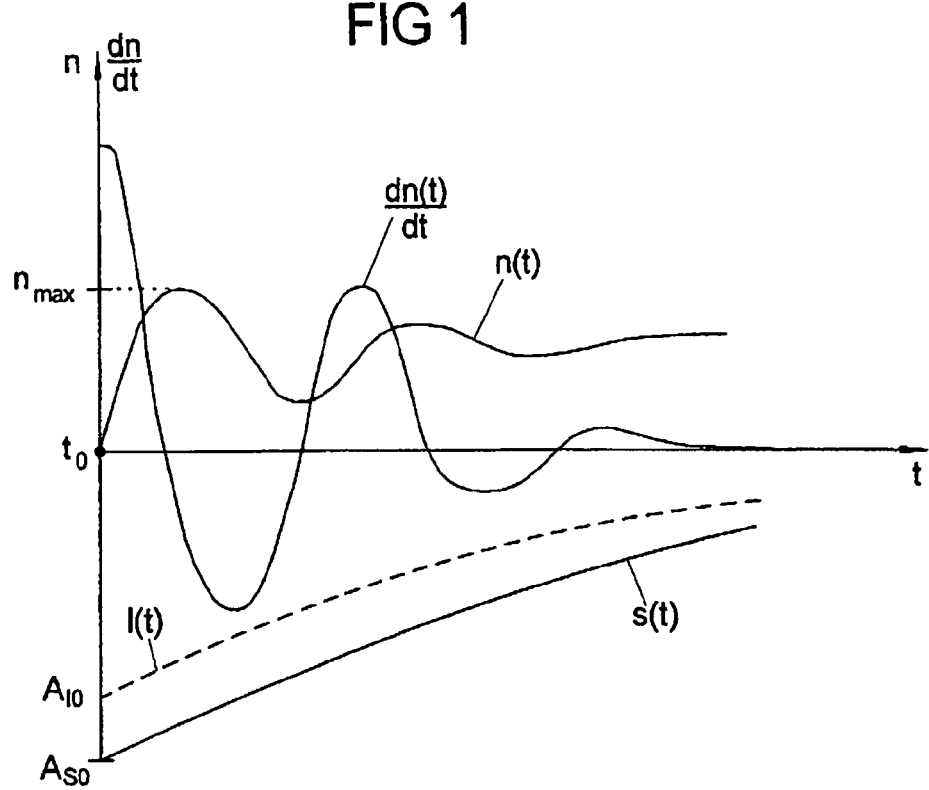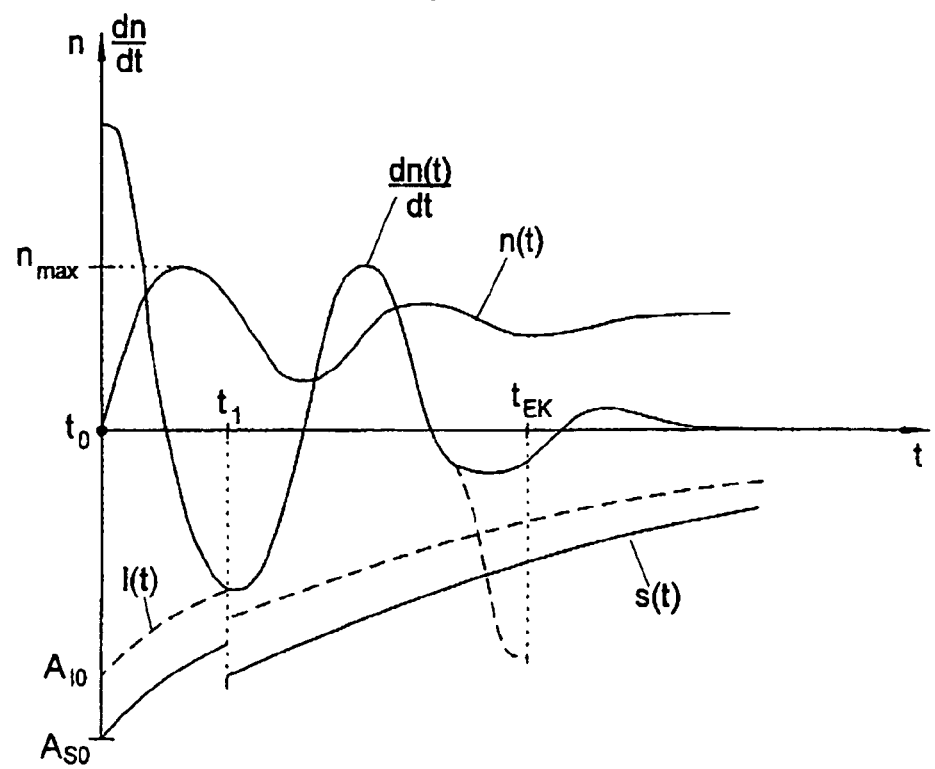

WINDOW LIFTER, CONTROLLING DEVICE FOR A WINDOW LIFTER AND METHOD FOR THE CONTROL OF A WINDOW LIFTER

CROSS REFERENCE TO RELATED APPLICATIONS

The present application is a continuation of International Application Ser. No. PCT/EP2004/011698, filed Oct. 16, 2004, which designated the United States and further claims priority to German patent application 20316222.6, filed Nov. 11, 2004, the both of which are herein incorporated by reference.

BACKGROUND OF THE INVENTION

The present invention relates to a window lifter, a controlling device of a window lifter, and a method for the control of a window lifter.

The control and regulation of the regulating motion of a translational adjustable component, especially a window lifter in motor vehicles, is known from DE 197 45 597 A1. An efficient protection against crushing, taking into considering a sufficient adjustment force in restriction areas and forces affecting the vehicle body and further conditioned by external forces, is guaranteed according to the above known method. The method is facilitated via a regulating device, a driving device and controlling electronics. The driving device produces a regulating force which equals the total necessary force for the adjustment of the component and is further a superfluous force whereby the sum is smaller or equal to a permitted crush force. The adjustment force or the superfluous force is regulated in dependence from forces affecting the body of the vehicle or from pieces of the vehicle body.

The solution, afforded the above method, guarantees a crush protection beyond the entire adjustment area, the protection further fulfilling very high safety requirements. Additionally, it is assured that the regulating force is also sufficient in restriction areas and that a regulating device adjusts a translational adjustable component gently on the material while considering the externally affecting influences on the vehicle body which may arise from vehicle operator influence. The forces affecting the vehicle body or the acceleration forces are hereby understood as external forces which are not immediately caused by the regulating device or by a driving device, but which for example occur because of the bad condition of a road (driving over a hole) or at closing the vehicle door.

The regulation of the adjustment force or the superfluous force occurs preferably in dependence from the moving direction of the translational adjustable component and from the acceleration forces occurring in the predominant direction of affect in such a way that the adjustment force is always smaller or equal to the permitted crush force. If an acceleration force affects the vehicle body and supports the closing motion of a translational adjustable component, the threshold is preferably decreased. In the event of an acceleration force directed against the closing motion, the threshold is increased. Accordingly, the adjusting force is always sufficient such that the closing motion is securely continued and a crush protection is guaranteed.

It is furthermore provided that at an occurrence of changing acceleration forces effecting the vehicle body within a determined time frame, a regulation of the adjustment force or the superfluous force is interrupted and a threshold is preset in such a way that the adjustment force is always smaller or equal to the permitted crushing force. The time frame may be for example 100 ms. This type of execution takes into account that the threshold does not always change within a short time frame at ever changing acceleration forces affecting the vehicle body which could lead to an impairment of the movement of the translational adjustable component. By presetting a fixed threshold, which is always smaller or equal to the permitted crush force, both a secure movement of the translatory adjustable component as well as a crush protection are guaranteed.

The acceleration forces affecting the vehicle body are preferably detected by a sensor, which may be a digital sensor. Digital signals can be further processed in control regulation electronics. For the adjustment of the regulation, one or more time-related successive signals of the sensor can be evaluated by the control and regulation electronics. The repeated evaluation of the sensor provides for the safe identification of a simultaneous occurrence of the acceleration forces caused by external influences and the forces conditional by a case of crushing.

A driving device for a motor driven vehicle is known from DE 195 17 958. For electronic window lifters, the rotation of the drive is immediately stopped at the driving device for the lifter if an obstacle is put against the movement of the window while the motor turns. The driving device serves for the opening and closing of the moveable piece (window) and can be selectively started and stopped.

An electrical power meter measures the power running through the drive in a starting compensation time, a current power changing detector determines a current power increment from the determined power at each constant time frame, and a driving controlling device delivers a first or a second control signal to the driving device, whereby the driving operation is continued with the first signal depending upon the polarity of the current power increment. The drive is immediately stopped with the second signal of the drive.

Two selection switches mark the direction of the drive, a pair of push-buttons for the respective driving directions and two self-changing switches for the two directions of the drive enable a rotation of the motor via actuating one of the push-buttons.

SUMMARY OF THE INVENTION

It is an object of the present invention to increase the safety of power window lifters of motor vehicles. This and other objects are addressed by an electronic controlling devices and power window lifter as detailed below and in the claims.

Per the present invention, a regulating device of a motor vehicle is controlled by a computer unit which is configured to perform and/or otherwise affect the method set out below. For the control, a programmable (EEPROM) or fixed wired (ROM) program is started in the computer unit. The computer unit may comprise a micro controller. A regulating motion of the window lifter mechanism is thereby stopped or a method to stop the regulating motion of the window lifter mechanism is started when a signal correlating to the rotary moment of the window lifter mechanism exceeds a response level. The response level is thereby not a constant threshold value but a preset function in the regulating range of a starting motion from a standstill of the window lifter mechanism. The response level is preferably dependent on the setting range or time by the preset function. This function can for example be displayed graphically by applying the setting time or range on the abscissa and the response level dependent from it on the ordinate. The course of this function is determined by at least one parameter, which value is changed in dependence from the starting motion of the window lifter mechanism.

The signal correlating to the rotary moment of the window lifter mechanism is for example a driving power or a measured force affecting the drive, and preferably a time-related change of the regulating speed of the window lifter mechanism. Depending on the used measured size of the signal, it can take positive or negative values. Values correlating to this signal, for example signals derived locally or from signal time-relations, are compared with the response level. The regulating motion of the window lifter mechanism is stopped in dependence of this comparative result.

The regulating range of the starting motion goes from the position of the previous standstill of the window lifter mechanism to the adjustment of the window pane with essentially constant regulating speed, if the regulating motion was not stopped automatically or manually by a user whereby the regulating range of the starting motion is respectively shortened. The regulating range can for example be defined according to time. As such, the regulating range of the starting motion is defined for a determined regulating time from standstill. The regulating range can alternatively be defined by the setting range in that the regulating range is defined for example by a determined number of driving rotations.

The values of the response level varying by the functional coherence are defined by the course of this function within the setting range. The function is for example a linear function according to one embodiment of the present invention:

$$Y = mx + A$$

Y is the value of the response level and x is the setting range or the setting time within the setting range of the starting motion. The linear function further includes variable m and A. A value of at least one of the variables or parameters is changed at least once in dependence of the starting motion of the window lifter mechanism. The course of the response level is adjusted to the starting conditions within the setting range of the starting motion.

According to one embodiment of the present inventive method, the value of the parameter changes only once by defining the value as a starting value of a mathematical relation of the regulating speed in the setting range of the starting motion. The parameter value A of the above linear function may be calculated by a proportionality factor as the mentioned mathematical relation from this ratio of the regulating speed before standstill of the window lifter mechanism and the maximal regulating speed in the setting range of the starting motion. Further to another embodiment of the present invention, the value of at least one of the parameters within the setting range of the starting motion is determined and changed several times. Different variants can thereby be used alternatively or in combination. The starting motion is advantageously determined in a first variant by measuring a regulating speed. The modification of the parameter value occurs in dependence from one or several measured regulating speeds. A second preferred variant provides that the modification of the parameter value occurs in dependence of a time-related modification of the regulating speed of the starting motion.

According to still another embodiment of the present invention, the power consumption is measured during the course of the process and the starting motion is determined by measuring the power consumed by the window lifter mechanism. The modification of the parameter value occurs in dependence of one or several power values of the starting motion.

In another embodiment of the present invention, a continuous calculation of the modification of the parameter value takes place. The continuous calculation affects a permanent post-learning of the course of the response level by determining the preferably current value of the parameter in dependence of the previous value of the parameter and the current value to the signal correlating to the rotary moment, especially the time-related modification of the regulating speed.

In another embodiment of the present invention, in addition to the function of the response level, a learning function is included. The learning function has the purpose of determining a new subsequent value of the parameter through a comparison of the current value to the signal correlating to the rotary moment. The learning function can thereby be typically identical to the function of the response level and only differentiate by different parameters. Alternatively, a learning function is preferably selected which is typically very different and which effects an objective or purposeful modification of the parameter. The modification of the parameter value in dependence from a mathematical relation to the signal correlating to the rotary moment preferably occurs in this further embodiment, especially of the time-related modification of the regulating speed to a learning function value of the learning function.

In another embodiment of the present invention, the parameter values effect back to the course of the learning function, by calculating the power parameter value of the learning function value of the learning function in dependence of a least one previous parameter value before the calculation.

The above mentioned continuous modifications of the value of the parameter are preferably combined with the above described one-time modification of the parameter value at the start of the regulation, in the setting range of the starting motion, by determining a starting value of the parameter for the modification. Different variants are possible in order to modify the parameter value by a starting value which may, as well, all be combined.

In a first variant, the starting value is read out from a memory as a preset value. This preset value can be programmed and stored into memory as a standard value or later learned according to several regulating processes.

A second variant, which may be combined with this first variant, provides that the starting value is determined in dependence from the maximal regulating speed in the setting range of the starting motion. This can occur in another embodiment of the present invention by determining the starting value from a mathematical relation of the regulating speed before standstill of the window lifter mechanism to the maximal regulating speed in the setting range of the starting motion.

In another embodiment of the present invention, a computer unit is provided which is set up to put at least one input value, which may be a time value, a range value, or a combination of the two, into the function. The range value may be for example a measured regulating path or a driving path of the drive of the regulating device. The computer is additionally set up to indicate at least one output value from the function which especially corresponds to the response level. The input and output occurs preferably continuously so as to calculate a continuous modification of the threshold. The function values have to be entirely recalculated for each modification in a simple case, so that all function values of a motion travel or a motion time are stored in a memory of the computer unit. Diverging from this, it is sufficient to calculate the next following function value(s) as well as respective modification in order to reduce the necessary calculating capacity of the computer unit.

In another embodiment of the present invention, the function is adjusted to the transient response and to the starting motion. The transient response is caused by several accelerating and braking processes of the driving motion during the starting of the regulating device, especially from the opposite direction. The transient process can thereby show several vibrations of the signal correlating to the rotary moment, which should not be evaluated as blockage of the regulating motion. These need to be distinguished by the computer from a blockage caused for example by a crush case. For differentiation, the threshold function of the form of the vibrations is adjusted in such a way that it does not cut the course of the correlating signal during a normal operation, i.e. if there is no crush case but only a little distance. To this end, another embodiment of the present invention provides for a function in that the amount is at least section-wise a decreasing function and preferably continuous.

In principle, a multiple number of functions could be used advantageously for the task. Especially advantageous and simple to be realized functions are linear functions, logarithmic functions or exponential functions.

An algorithm to stop an exceeding response level is advantageously activated only when a blockage of the regulating motion can occur based on the starting of the motion of the element needing to be regulated for the regulating device. For this, the stopping algorithm is activated according to the determination of the maximum ($n_{max}$) of the regulating speed (n) in the starting motion.

The invention is further related to a window lifter of a motor vehicle having a window lifter drive to regulate the position of a window pane via a mechanical coupling between the window lifter drive and the window pane, the mechanical coupling being a cable pull which is connected with the window pane, a cable drum which is effectively and mechanically connected with the window lifter drive, and a controlling device preferably comprising a computer unit for effecting the above mentioned controlling characteristics.

The invention further includes a controlling device of a window lifter of a motor vehicle, comprising motive agents for powering a window lifter drive, sensory agents to detect the regulating motion of the window lifter device, and a computer unit arranged to execute a program whereby a regulating motion of the window lifter drive is stopped or a method to start the stopping of the regulating motion of the window lifter drive, when a signal correlating to the rotary moment of the window lifter drive exceeds a response level, whereby the response level in the setting range of a starting motion from standstill of the window lifter drive is a preset function especially dependant on the setting range and time with at least one parameter determining the course of this function, which value is changed in dependence of the starting motion of the window lifter drive.

BRIEF DESCRIPTION OF THE SEVERAL VIEWS OF THE DRAWINGS

The present invention is set out below and in more detailed according to examples embodiments with reference to the following drawings, wherein:

FIG. 1 depicts a schematic view of curve progressions during a starting motion, and FIG. 2 depicts a schematic view of a curve progression with a later learned threshold function and a crush case during a starting motion.

DETAILED DESCRIPTION OF THE INVENTION

The courses and functions shown in FIGS. 1 and 2 refer to one embodiment of the present invention. An aim of this embodiment is to reduce the force which is effected on a squeezed body part during the starting motion of a window lifter. To avoid an injury of the crushed body part, the regulating motion is stopped immediately after recognition of the crush case. The regulating motion is reversed after the stopping to release the crushed body part.

A computer unit evaluates a signal n for the recognition of the crush case which correlates to the rotary moment of the drive. This signal is the rotary frequency n of the drive in this embodiment and the time-related modification of the rotary frequency dn/dt deviated therefrom.

A crushing of a body part between the pane surface and the door frame effects an immediate braking of the regulating speed as well as a braking of the driving speed coupled to the mechanics of the window lifter. The significant braking in a crush case results in a significant negative value of the modification of the rotary frequency dn/dt. If this negative value exceeds a response level s(t), a regulating motion of the window lifter mechanism is stopped. This stopping decision can occur after further conditions are considered, including several successive negative values below the response level s(t). Several of these conditions can also be evaluated time-successively, such that a program to stop the regulating motion of the window lifter mechanism is advantageously started when the first negative value remains under the response level s(t).

In contrast to a constant threshold, the response level s(t) is a function, which falls value wise within the embodiment of FIG. 1 and is developed as an e-function. The initial value $A_{SO}$ at time $t_0$ is determined from the ratio of the regulating speed before a previous stopping and the maximal starting idle-running speed $n_{max}$. This modification of the course of the response level s(t) by the modification of the initial value $A_{SO}$ enables one to already adjust the detection characteristics of the crush case for different starting behavior.

A further improvement of the sensibility of the crush detection is obtained by application of the learning curve l(t) (dotted line in FIGS. 1 and 2). This learning curve l(t) is arranged within the response envelope of the response level s(t), as shown in FIG. 1. The figure further depicts an initial learning value $A_{10}$ at time $t_0$ which correlates to the initial value $A_{SO}$ of the response level s(t).

A post learning at time $t_1$ is shown in FIG. 2. The learning curve l(t) cuts the curve of the time-related modification of the rotary frequency dn/dt at time $t_1$. This intersection is determined mathematically and subsequent redetermination of both the learning curve l(t) and response level s(t) is depicted in FIG. 2. Herein, a recalculating of the initial values $A_{10}$ and $A_{SO}$ is performed in such a way that the learning curve l(t) would no longer cut the curve of the time-related modification of the rotary frequency $d_n/d_t$. In the computer unit of the controlling device of the window lifter for the modification of the response level, parameter values, especially the initial value $A_{SO}$, is overwritten in the memory of the computer unit. The new value is updated in a continuous list so as to provide ability to draw conclusions from the learning process.

Additionally, the determination of a crush case is shown in FIG. 2 at time $t_{EK}$. The course of the time-related modification of the rotary frequency dn/dt deviates from the normal starting behavior in the case of a crush. The deviation is shown as a dotted line in FIG. 2. The strong braking caused by the crush process leads therefore to significant negative values of the modification of the speed of the drive $dn(t)_{EK}/dt$. This exceeds, by several times, the response level s(t). Several exceeding values will be determined and then the electro-drive will be stopped and the driving directions reversed.

Further to another embodiment of the present invention, a calculation is made for the modification of the parameter value in dependence from the detection of a minimum of the signal (dn/dt, n) correlating to the rotary frequency and especially the time-related modification (dn/dt) of the regulating speed (n). A calculation of the modification of the parameter value occurs thereby preferably in dependence from the value of the signal correlating to the sampling point ($t_{min}$) of the minimum.

A concrete development of this variant is shown schematically in FIG. 2. The function is a linear function similar to the above function:

$$S(t)=m*t+A'$$

The initial value A' is defined as a sampling point $t_{min}$. This sampling point is determined by detecting the minimum of the first deviation dn(t)/dt of the rotary frequency n according to time t. This may, for example, occur according to the second deviation of the rotary frequency n according to time t and at zero transmission detection. At sampling time $t_{min}$, the value of the function S(t) is set on a value which is offset to a threshold value offset from the sampling value dn/dt to the sampling time $t_{min}$. A post-learning of the response level S(t) of the crush protection occurs to and at the sampling points $t_2$ and $t_3$. In this embodiment, an after-learning occurs thereby in a form of a step function, which exclusively reduces the difference between the response level S(t) and the first deviation dn(t)/dt of the rotary frequency n according to time t. In addition, a post-learning occurs exclusively, if the first deviation dn(t)/dt of the rotary frequency n according to time t accepts negative values.

The invention claimed is:

1. An electronic controlling device for obstruction prevention in a closing of a moving part in a motor vehicle, comprising:
   a regulating device for regulating a motor drive
   sensory agents arranged to sense a rotary moment of said motor drive and output a drive signal to said controlling device, said signal indicative of said rotary moment; and
   a computer unit arranged to receive said drive signal and effect a halting or initiation of a halting of said regulating device in response to a detection of said drive signal exceeding a response level set according to a preset function, said response level being a time regulated and setting dependent preset function, and said preset function being within a setting range of a starting motion from a standstill with at least one parameter determined in a course of preset function having a value which is changed in accordance with a starting motion of said drive.

2. A method for controlling a regulating device of a motor vehicle via a controlling device, said method comprising the steps of:
   regulating motion of a motor drive with a regulating device arranged with said controlling device,
   sensing said regulating motion with sensory agents arranged with said controlling device to sense said regulating motion and a rotary moment of said motor drive and output a signal indicative of said regulating motion; and
   halting or initiating a halting of said regulating motion via a computer unit arranged with said controlling device if a response level of said signal is within one of a setting range and time dependent function from a start of said drive or from a standstill with at least one parameter value determining a course of said function, which value is changed in dependence from a starting motion of said drive.

3. The method according to claim 2, further comprising the steps of:
   determining said starting motion by measuring a regulating speed of said drive; and
   modifying said parameter value in dependence of one or several measured regulating speeds.

4. The method according to claim 2, wherein said step of modifying further comprises the step of modifying said parameter value in dependence of a signal derivation with respect to said time or to said setting range.

5. The method according to claim 4, wherein said signal is said regulating speed.

6. The method according to claim 2, further comprising the steps of:
   determining starting motion by measuring consumed current of said drive, and
   modifying said parameter in dependence of one or several current values of said starting motion.

7. The method according to claim 2, further comprising the steps of:
   continuously calculating and modifying said parameter according to a previous parameter value and according to said signal relating to said rotary moment or a derivation of said signal relating to said rotary moment.

8. The method according to claim 2, further comprising the steps of:
   calculating a modification of the parameter value, said modification occurring in dependence of a detected minimum of said signal correlating to a rotary moment or of a detected minimum of a derivation of said signal correlating to said rotary moment.

9. The method according to claim 8, further comprising the step of:
   calculating a modification of the parameter value, said modification being in dependence of a value of said detected minimum.

10. The method according to claim 9, wherein said mathematical relation is a learning function differing from said response level.

11. The method according to claim 2, further comprising the steps of:
    modifying said parameter value in accordance with a learning function value of a learning function and in dependence from a mathematical relation to said signal or a derivation of said signal.

12. The method according to claim 11, wherein said learning function value of said learning function is currently calculated in dependence from at least one previous parameter value.

13. The method according to claim 2, further comprising the step of defining a starting value of the parameter.

14. The method according to claim 13, wherein said starting value is defined in dependence from a maximal regulating speed in a setting range of a starting motion.

15. The method according to claim 13, wherein said starting value is defined from a mathematical ratio of a regulating speed before standstill of said drive and a maximal regulating speed in said setting range of the starting motion.

16. The method according to claim 2, wherein said function is a decreasing function at least by sections according to its value which may decrease continuously.

17. The method according to claim 2, further comprising the step of activating an algorithm to stop at exceeding the response level according to a determination of a maximum regulating speed in said starting motion.

18. The method according to claim 2, further comprising the step of adjusting said function to a transient response of said starting motion.

* * * * *